3,690,846
Patented Sept. 12, 1972

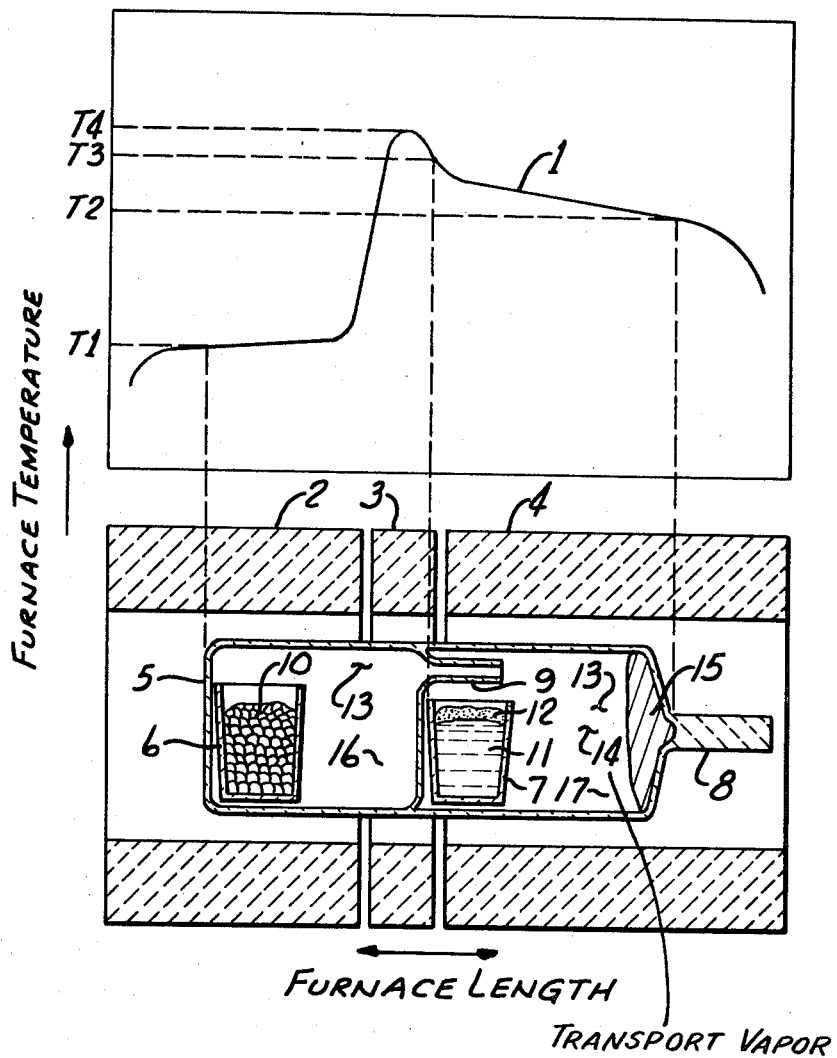

3,690,846
METHOD OF MANUFACTURING SEMICONDUCTING COMPOUNDS BY VAPOR GROWTH METHOD
Shin-ichi Akai and Katsunosuke Aoyagi, Osaka, Japan, assignors to Sumitomo Electric Industries, Ltd., Osaka, Japan
Filed Sept. 9, 1970, Ser. No. 70,231
Int. Cl. B01d 7/00; B01j 17/28
U.S. Cl. 23—294               6 Claims

ABSTRACT OF THE DISCLOSURE

This invention relates to a method of manufacturing semiconducting compounds, particularly GaP, which has a high dissociation pressure (about 39 atm.) at its melting point (1465° C.), in the crystalline ingot form. The method is a new improvement of the vapor growth method, and comprises the step of making use of a crystal growing furnace having a low temperature zone ($T_1$), a maximum temperature zone ($T_4$) and a high temperature zone providing a temperature gradient ($T_3$–$T_2$), where $T_4 > T_3 > T_2 > T_1$, the step of using a sealed fused silica reaction tube having a first temperature zone which is positioned between the $T_1$ and $T_4$ zones, a second temperature zone which is positioned between $T_3$ and $T_2$ zones, and a separating wall between the first and second temperature zones with a thin silica tube (capillary) retained thereby to allow the vapor of the volatile constituent to diffuse through but to prevent the vapor of volatile compounds of the non-volatile constituents from diffusing therethrough, the step of placing the volatile constituent such as phosphorous in the first temperature zone where the vapor pressure of said volatile constituent is controlled by the temperature $T_1$, and the step of positioning the non-volatile constituent such as gallium and a transport agent, particularly a halogen or a halide of the non-volatile constituents in the hotter part ($T_3$) of the second temperature zone wherein the thin layer of said semiconducting compound is produced on the surface of the solution of the non-volatile constituent due to supersaturation of the volatile constituent. This thin layer of semiconducting compound reacts with the transport agent to form volatile compounds which diffuse to the colder part ($T_2$) of the second temperature zone and react with the volatile constituent to form a crystal of said semiconducting compound, but are prevented from diffusing into the first temperature zone by said separating wall.

BACKGROUND OF THE INVENTION

This invention relates to a technique for preparing semiconducting compounds, particularly GaP, which have a high dissociation pressure at its melting point, in the crystalline ingot form, by an improved vapor growth method.

Semiconducting compounds with a high dissociation pressure at their melting points such as GaP, InP, AlAs, AlP, $Ga_{1-x}Al_xP$, $Ga_{1-x}Al_xAs$, $In_{1-x}Ga_xP$, $In_{1-x}Al_xP$, $InAs_{1-x}P_x$ (where $0<x<1$) ZnTe, $ZnTe_{1-x}Se_x$ ($0<x<1$), $ZnSiP_2$, $ZnGeP_2$, $ZnSiAs_2$, $Cd_3Pd_2$ and the like are materials of great importance for functional devices and solid state optical devices.

Among them, GaP has a dissociation pressure of about 39 atmospheres at its melting point of about 1465° C., therefore it is very difficult to synthesize stoichiometric or nearly stoichiometric melts of gallium phosphide from gallium and phosphorous, and to crystallize the melts to form a GaP crystalline ingot in a sealed fused-silica reaction tube.

One method of preparing GaP crystal in a sealed fused-silica reaction tube is the so-called solution growth method in which a GaP crystal is grown from a gallium or tin solution including a small amount of gallium phosphide. This method has a serious drawback in that only tiny crystals can be grown. Another method is the vapor growth method. This method uses a transport agent such as a halogen and makes use of the reaction between volatile gallium compounds such as gallium halides and phosphorous vapor, but also has disadvantages in that crystals of large ingot form cannot be grown directly from gallium and phosphorous. Another important method recently discovered is the liquid-encapsulation pulling method. But this method has a drawback in that poly-crystalline GaP is required as a raw material because stoichiometric GaP cannot be synthesized directly from the constituents by this method.

SUMMARY OF THE INVENTION

According to the present invention, GaP of the large crystalline ingot form and with a high purity can be synthesized directly from the constituents by a newly improved vapor growth method.

The more generally adopted vapor growth method for GaP crystals which are synthesized directly from gallium and phosphorous makes use of a halogen or a metal halide as a transport agent, and comprises the steps of introducing a halogen or a metal halide into a fused silica reaction tube having a high temperature zone (Th) and a low temperature zone (Tc), placing the gallium metal in the Th zone, which reacts with said halogen to produce gallium halides (i.e. volatile compounds), and positioning in the Tc zone red phosphorous which vapolizes into the Tc and Th zones, and said gallium halides react with phosphorous vapor to form tiny crystal chunks of GaP between Th and Tc or at the temperature zone below the Th zone.

This invention will be exemplified by a case wherein GaP as a semiconducting compound having a high dissociation pressure at its melting point is grown in a fused silica reaction tube, and wherein a small quantity of gallium iodide as a transport agent is used. The main object of this invention is to grow the large crystalline ingot of said semiconducting compound directly from the constituents. It therefore, goes without saying that the material to be synthesized is not limited to GaP and the transport agent to be used is not limited to gallium iodide.

This invention, in the case of GaP, makes use of a crystal growing furnace having a low temperature zone ($T_1 \gtrsim 430°$ C.), a maximum temperature zone ($T_4 = 1100$–$1200°$ C.) and a high temperature zone providing a temperature gradient (from $T_3 = 1000$–$1100°$ C. to $T_2 = 750$–$950°$ C.), and comprises the steps of using a sealed fused silica reaction tube having a first temperature zone which is positioned between the $T_1$ and $T_4$ zones, a second temperature zone which is positioned between the $T_3$ and $T_2$ zones, and a separating quartz wall between the first and second temperature zones which has a thin or small bore silica tube (capillary) to allow the vapor of phosphorous to diffuse therethrough but prevents the vapor of the volatile compounds (gallium iodides) from diffusing through, the step of placing red phosphorous in the first temperature zone where the vapor pressure of the phosphorous is controlled by $T_1$ (high enough to supersaturate the gallium solution), and the step of positioning gallium metal (which melts at about 29.5° C.) and a small amount of gallium iodide in the hotter part ($T_3$) of the second temperature zone where the thin layer of gallium phosphide is produced on the surface of the gallium solution due to supersaturation of volatile constituent, and this thin layer of GaP reacts with gallium iodide to form a mixture of gallium iodides which diffuse to colder part ($T_2$) of the second temperature zone and reacts with phosphorous vapor to form a well-formed crystalline ingot of GaP. The above-mentioned quartz separating wall having thin silica tube plays one of the essential parts of this invention and prevents gallium iodides from diffusing into the first temperature zone to form tiny crystal chunks of GaP by reacting with the phosphorous vapor. This eventually makes it possible to grow GaP of well-formed large crystalline ingot with a high yield of almost 100%.

In place of the gallium iodide added in the hotter part ($T_3$) of the second temperature zone, iodine, other halogens or other metal halides are also capable of being used.

The place to add a transport agent to the silica tube such as a halogen may be selected in any part of the above-mentioned second temperature zone instead of just the hotter part ($T_3$) of that zone, because a halogen is very volatile and it is easy to produce halogen vapor or gallium halide vapor.

An object of this invention is to provide a technique to manufacture a semiconducting compound crystal having a high dissociation pressure at its melting point as a well-formed large crystalline ingot directly from the constituents by a newly improved vapor growth method.

Another object of this invention is to provide a technique to manufacture a semiconducting compound crystal having a high dissociation pressure at its melting point and having a high purity with higher yield than methods heretofore employed.

Another object of this invention is to provide a method of manufacturing low-priced source materials with high purity for vapor phase and liquid phase epitaxial growth of a semiconducting compound crystal having a high dissociation pressure at its melting point.

Another object of this invention is to provide a method of manufacturing low-priced raw materials of a well-formed large ingot for the liquid-encapsulation pulling growth of a semiconducting compound crystal having a high dissociation pressure at its melting point.

Another object of this invention is to provide a method of preparing a single crystalline ingot of a semiconducting compound having a high dissociation pressure at its melting point.

A characteristic of this invention is that, when manufacturing a semiconducting compound having a high dissociation pressure at its melting point, a crystal growing furnace having a low temperature zone ($T_1$), maximum temperature zone ($T_4$) and a high temperature zone providing a temperature gradient ($T_3$-$T_2$), where $$T_4 > T_3 > T_2 > T_1$$

is used.

Another characteristic of this invention is that, when manufacturing said semiconducting compound, a sealed fused silica reaction tube is used having a first temperature zone which is positioned between $T_1$ and $T_4$ zones, a second temperature zone which is positioned between $T_3$ and $T_2$ zones, and separating wall between first and second temperature zones which has a thin silica tube (capillary) to allow the vapor of volatile constituent of said semiconducting compound to diffuse through but to prevent the vapor of the volatile compounds from diffusing through a volatile constituent is placed in the first temperature zone where the vapor pressure of said volatile constituent is controlled by $T_1$ (high enough to super saturate solution of non-volatile constituent), and a non-volatile constituent is placed in the hotter part ($T_3$) of the second zone where the thin layer of said semiconducting compound is produced on the surface of the solution of the non-volatile constituent due to supersaturation of the volatile constituent, and a transport agent is placed in any part of the second zone and reacts with the non-volatile constituent to produce volatile compounds.

The foregoing and other objects, features and advantages of this invention will be apparent from the following more particular description of the preferred embodiment of the invention as illustrated in the accompanying drawing.

In the drawing:

The figure illustrates the apparatus used to manufacturing a well-formed large crystalline ingot of GaP by the newly improved vapor growth method of this invention. It comprises a schematic diagram of the crystal growing furnace, a graphical illustration of the temperature distribution of the furnace and a section of the sealed fused silica reaction tube.

Referring to the figure, there is shown the temperature distribution 1 of the crystal growing furnace for manufacturing gallium phosphide by this newly improved vapor growth method, low temperature zone 2, maximum temperature zone 3, high temperature zone 4 of the furnace, the sealed fused silica tube 5 having a quartz wall with thin silica tube 9 (capillary) and quartz radiation rod 8, red phosphorous 10 in the fused silica vessel 6, gallium solution 11 in the fused silica vessel 7, first temperature zone 16 and second temperature zone 17 in fused silica reaction tube 5. Red phosphorous 10 vaporizes to produce phosphorous vapor 13 in first temperature zone 16 and second temperature zone 17. The vapor pressure of the phosphorous is controlled by $T_1$ (about 430° C. or more) at about 1 atmosphere or more. Phosphorous vapor 13 diffuses into second temperature zone 17 and reacts with gallium solution 11 to produce GaP layer 12 on the surface of the gallium solution by supersaturation of phosphorous. This reaction may be represented by the formula:

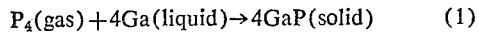

$$P_4(gas) + 4Ga(liquid) \rightarrow 4GaP(solid) \qquad (1)$$

A small amount of gallium tri-iodide is introduced into the second temperature zone 17 to produce $GaI_3$ vapor 14 and to provide a gallium iodide pressure of approximately 1 atmosphere or less. This $GaI_3$ vapor 14 reacts with GaP layer 12 in the hotter part ($T_3$=1000–1100° C.) of the second temperature zone to produce gallium iodide vapor and phosphorus vapor, and this reaction may be represented by the formula:

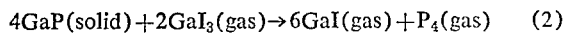

$$4GaP(solid) + 2GaI_3(gas) \rightarrow 6GaI(gas) + P_4(gas) \qquad (2)$$

GaI vapor and $P_4$ vapor (with a small amount of $P_2$ vapor) diffuse into the colder part ($T_2$=750–950° C.) of the second temperature zone 17 and react with each other to form GaP crystal 15. This reaction is given by the reverse reaction of (2), that is:

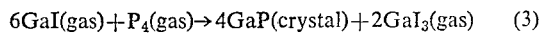

$$6GaI(gas) + P_4(gas) \rightarrow 4GaP(crystal) + 2GaI_3(gas) \qquad (3)$$

$GaI_3$ vapor formed with GaP crystal 15 diffuses back to hotter zone ($T_3$) of the second zone due to the partial pressure gradient of the $GaI_3$ vapor, and again reacts with GaP layer 12 to produce GaI vapor and phosphorous vapor as shown by Equation 2.

Thus GaP crystal 15 grows to a well-formed large crystalline ingot by cyclic motion of gallium iodide vapor and cyclic reactions of Equations 2 and 3.

The maximum temperature zone ($T_4$=1100–1200° C.) together with the thin capillary tube 9 prevent the gallium iodide vapor from diffusing into the first temperature zone to react with phosphorus vapor 13 and to form tiny GaP crystal chunks. This eventually makes it possible to grow GaP of a well-formed large crystalline ingot with a high yield of almost 100%. Unless the furnace has the maximum temperature zone ($T_4$) and the separating wall has the thin quartz tube 9, gallium iodide vapor 14 generated in the second temperature zone 17 will diffuse into the first zone, thus gallium and phosphorous are lost in the form of tiny GaP crystal chunks. The temperature $T_1$ is required to be high enough for phosphorous vapor 13 to saturate gallium solution 11 and to form GaP layer 12 on the surface of gallium melt 11, and this phosphorous pressure also operates so as to prevent the gallium iodide vapor 14 from diffusing into the first temperature zone 16.

The size of the thin silica tube 9 is not limited and a silica tube having an inner diameter of from 0.5 mm. to 5 mm. and a length of from 1.0 cm. to 15.0 cm. is useful.

If the furnaces 2, 3 and 4 are moved at a speed of 100 $\mu$m.~ 500 $\mu$m. per hour to the left in relation to the reaction tube 5, the growth rate of GaP ingot becomes slightly higher than the static growth condition.

In an experimental run, following the teachings of the present invention, the temperature $T_1$ was set to be 430° C., $T_2$ 950° C., $T_3$ 1100° C. and $T_4$ 1200° C. Consequently a large GaP crystalline ingot having a diameter of 30 mm. and a length of 50 mm. was grown in about two weeks. The growth rate of a GaP ingot depends on the temperatures $T_1$, $T_2$, $T_3$ and $T_4$, the species of transport agent and the amount of transport agent and also the geometry of part of radiation rod 8.

In the aforementioned description, this invention has been exemplified particularly with respect to the case where GaP as a semiconducting compound, having high dissociation pressure at its melting point, is grown in a fused silica reaction tube and a small amount of gallium iodide as a transport agent is used.

In place of $GaI_3$, iodine may be used as a transport agent. In the case, reactions:

$$2Ga(liquid)+3I_2(gas)=2GaI_3(gas) \quad (4)$$

or $$2GaP(solid)+3I_2(gas)=2GaI_3(gas)+\tfrac{1}{2}P_4(gas) \quad (5)$$

take place and $GaI_3$ vapor is produced.

In the place of the gallium iodide system, other gallium halide systems may be made use of. In these gases, reactions:

$$3GaBr(gas)+\tfrac{1}{2}P_4(gas) \rightarrow GaBr_3(gas)+2GaP(solid) \quad (6)$$

and $$3GaCl(gas)+\tfrac{1}{2}P_4(gas) \rightarrow GaCl_3(gas)+2GaP(solid) \quad (7)$$

are used.

Water vapor may be also used as a transport agent, which reacts with the GaP layer as given by the following equation:

$$H_2O(gas)+2GaP(solid) \rightleftharpoons Ga_2O(gas)\\+H_2(gas)+\tfrac{1}{2}P_4(gas) \quad (8)$$

Other transport agents include $GaBr_3$, $GaCl_3$, $H_2O$, $InI_3$, $InI$, $InBr_3$, $InBr$, $InCl_3$, $InCl$, $PbCl_2$, $PbBr_2$, $PbI_2$, $PI_3$ and so on. Moreover HCl, HBr and so on may be used.

$ZnCl_2$ and $CdCl_2$, if used as a transport agent, are applicable to grow a p type GaP ingot. $SnCl_2$, $TeCl_4$, $TeBr_4$, $SeCl_4$, if used, are applicable to grow an n type GaP ingot.

This invention is also applicable to grow the large crystalline ingot of a semiconducting compound other than GaP which has a high dissociation pressure at its melting point directly from the constituents, using a transport agent abovementioned.

While the invention has been particularly shown and described with reference to preferred embodiments thereof, it will be understood by those skilled in the art that the foregoing and other changes in form and details may be made therein without departing from the spirit and scope of the invention.

We claim:

1. A method of manufacturing semiconducting compounds, which have a high dissociation pressure at their melting point, in the form of a large crystalline ingot, comprising the steps of providing a crystal growing furnace having in a series respectively a low temperature zone ($T_1$), a maximum temperature zone ($T_4$) and a high temperature zone providing a temperature gradient ($T_3$–$T_2$) and wherein $T_3$ is positioned intermediate $T_2$ and $T_4$, where $T_4 > T_3 > T_2 > T_1$; providing a sealed fused-silica reaction tube having a first temperature zone which is positioned in the $T_1$ and $T_4$ zones of said furnace, a second temperature zone which is positioned in the $T_3$–$T_2$ zone of said furnace, and a separating wall between said first and second temperature zones having a silica tube with a small bore passing therethrough to allow the vapor of the volatile constituent of a semiconducting compound to diffuse through said bore but to prevent the vapor of the volatile compounds of the non-volatile constituent of the semiconducting compound from diffusing therethrough; placing the volatile constituent of a semiconducting compound having a high dissociation pressure at its melting point in said first temperature zone where the vapor pressure of said volatile constituent is controlled by said temperature $T_1$; positioning a solution of the non-volatile constituent of said semiconducting compound in the hotter part ($T_3$) of said second zone; maintaining $T_1$ high enough to supersaturate said solution to thereby form a thin layer of said semiconducting compound on the surface of said solution; and placing a transport agent selected from the group consisting of halogens, water vapor, halides of the non-volatile constituents, halides of the volatile constituents, halides of hydrogen and halides of dopants in said second temperature zone, said transport agent reacting with said thin layer of said semiconducting compound to form volatile compounds which diffuse to the colder part ($T_2$) of said second temperature zone and react with said voltaile constituent to form a crystal of said semiconducting compound.

2. A method as described in claim 1 wherein said small bore silica tube has an inner diameter of from 0.5 mm. to 5 mm. and a length of from 1.0 cm. to 15.0 cm.

3. A method as described in claim 1 wherein said transport agent is a halogen.

4. A method as described in claim 1 wherein said semiconducting compound is gallium phosphide, said volatile constituent is phosphorous and said non-volatile constituent is gallium.

5. A method as described in claim 1 wherein said transport agent is a halide of the non-volatile constituent.

6. A method as described in claim 1 wherein said semiconducting compound is gallium phosphide and $T \geq 430°$ C., $T_2 \approx 750$–$950°$ C., $T_3 \approx 1000$–$1100°$ C., and $T_4 \approx 1100$–$1200°$ C.

References Cited

UNITED STATES PATENTS

| | | | |
|---|---|---|---|
| 3,093,517 | 6/1963 | Lyons | 23—294 |
| 3,224,911 | 12/1965 | Williams et al. | 23—294 |
| 3,230,053 | 1/1966 | Wakelyn et al. | 23—301 |
| 3,242,015 | 3/1966 | Harris | 23—301 |
| 3,243,267 | 3/1966 | Piper | 23—301 |
| 3,249,473 | 5/1966 | Holonyak | 23—294 |
| 3,362,795 | 1/1968 | Weisbeck | 23—301 |

FOREIGN PATENTS

| | | | |
|---|---|---|---|
| 213,227 | 9/1955 | Australia | 23—294 |
| 998,167 | 7/1965 | United Kingdom | 23—294 |
| 1,027,159 | 4/1966 | United Kingdom | 23—294 |
| 1,112,044 | 8/1961 | Germany | 23—294 |

NORMAN YUDKOFF, Primary Examiner

R. T. FOSTER, Assistant Examiner

U.S. Cl. X.R.

23—204

UNITED STATES PATENT OFFICE
CERTIFICATE OF CORRECTION

Patent No. 3,690,846     Dated September 12, 1972

Inventor(s) Shin-ichi Akai and Katsunosuke Aoyagi

It is certified that error appears in the above-identified patent and that said Letters Patent are hereby corrected as shown below:

Col. 1, between lines 7 and 8, insert the following:

--Claims priority, application in Japan,

September 10, 1969     44-71868

Signed and Sealed this

Twenty-eighth Day of March 1978

[SEAL]

Attest:

RUTH C. MASON
Attesting Officer

LUTRELLE F. PARKER
Acting Commissioner of Patents and Trademarks

UNITED STATES PATENT OFFICE
CERTIFICATE OF CORRECTION

Patent No.  3,690,846          Dated  September 12, 1972

Inventor(s)  Shin-ichi Akai and Katsunosuke Aoyagi

It is certified that error appears in the above-identified patent and that said Letters Patent are hereby corrected as shown below:

Col. 1, between lines 7 and 8, insert the following:

--Claims priority, application in Japan, September 10, 1969  No. 71868/69--

Col. 1, line 60, erase "$Cd_3Pd_2$" and substitute --$Cd_3P_2$--

Col. 3, line 62, erase "a volatile" and substitute --. A volatile--

Col. 3, line 64, erase "super" and substitute --super- --

Col. 6, line 44, erase "T" and substitute --$T_1$--

This certificate supersedes certificate issued March 28, 1978.

Signed and Sealed this

Twentieth Day of June 1978

[SEAL]

Attest:

RUTH C. MASON
Attesting Officer

DONALD W. BANNER
Commissioner of Patents and Trademarks